No. 870,099. PATENTED NOV. 5, 1907.
E. F. HARTSHORN.
SHADE ROLLER.
APPLICATION FILED DEC. 10, 1906.
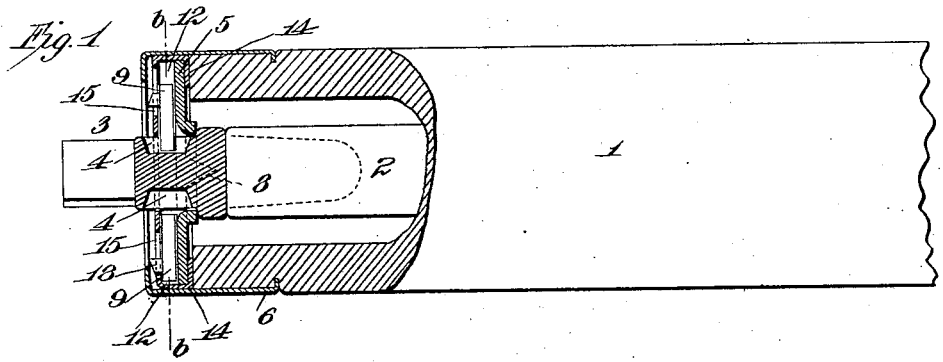
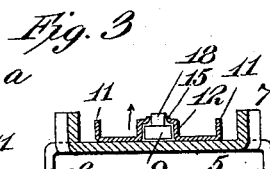 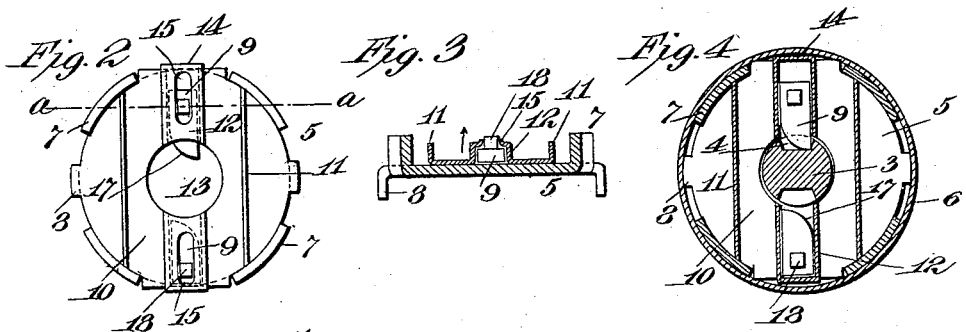 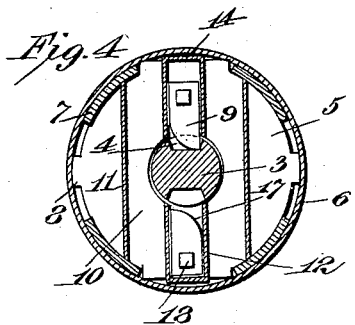
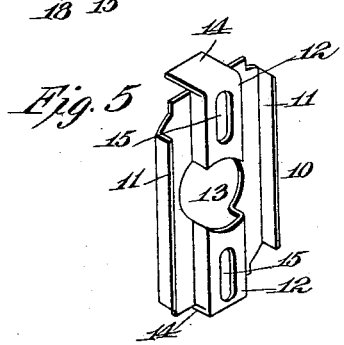 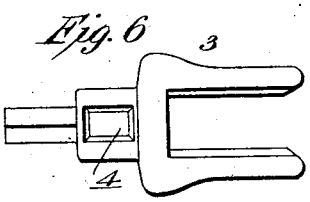
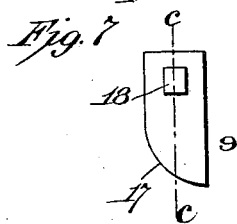 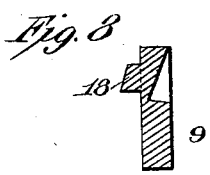 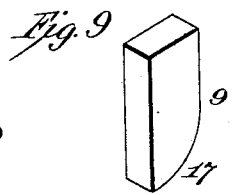
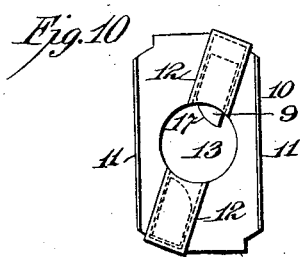
Witnesses:
Jas. F. Coleman
John P. Lobel
Inventor
Edmund F. Hartshorn
by Dyer & Dyer
Attorneys.

UNITED STATES PATENT OFFICE.

EDMUND F. HARTSHORN, OF NEWARK, NEW JERSEY, ASSIGNOR TO STEWART HARTSHORN COMPANY, OF EAST NEWARK, NEW JERSEY, A CORPORATION OF NEW JERSEY.

SHADE-ROLLER.

No. 870,099.  Specification of Letters Patent.  Patented Nov. 5, 1907.

Application filed December 10, 1906. Serial No. 347,094.

*To all whom it may concern:*

Be it known that I, EDMUND F. HARTSHORN, a citizen of the United States of America, residing in Newark, county of Essex, State of New Jersey, have invented a Shade-Roller, of which the following is a specification.

The object which I have in view is the production of a shade roller which will have advantages in simplicity, cheapness and durability.

Other objects will more fully appear from the following specification:

In the accompanying drawings, Figure 1 represents a longitudinal section of a portion of a roller embodying my invention, Fig. 2 is a front view thereof, with the spear removed, Fig. 3 is a sectional view thereof on the line a—a of Fig. 2, Fig. 4 is a sectional view on the line b—b of Fig. 1, Fig. 5 is a perspective view of the cap-plate or dog casing, Fig. 6 is an elevation of the spear, Fig. 7 is an elevation of one of the dogs, Fig. 8 is a sectional view thereof on the line c—c of Fig. 7, Fig. 9 is a perspective view of a modified form of dog, and Fig. 10 is a front view of the cap showing a modification.

In all of the views, like parts are indicated by the same reference characters.

In the drawing, the roller 1 is hollow and has within it the rod upon which is the spring, in the usual manner. Upon the end of the rod 2 is a spear 3. This spear is shown as having a bifurcated end (see Fig. 6) forming a means of attachment for the rod 2, but such conformation of the spear is solely for purposes of illustration, and it is to be understood that any other form of spear may be employed. The outer extremity of the spear is flattened in the usual manner for engagement with the notch on the bracket so as to keep the spear and rod 2 from turning and to permit the roller 1 to rotate. The spear is provided with notches 4—4. These notches are two in number and are diametrically opposed to each other, as appears in Fig. 4. The bases of the notches are flat, but the walls are preferably slightly inclined as shown for facility in casting. The details of the roller, spring rod and spear may be modified, as desired, as they form no part of the present invention. The spear passes through a hole in the cap 5, within which is secured a bearing. This cap 5 is circular in outline and is secured against the end of the roller 1 by any means, as for instance by means of a sheet metal ferrule 6 which is attached to the roller in any manner such as by rolling the free end into the wood of the roller, as shown in Fig. 1. The cap is provided with an interrupted flange 7 against which the ferrule engages, and with sharpened projections 8 which are embedded in the end of the roller to prevent turning of the cap. The cap serves as a means of closing the end of the roller and also as a bearing for the spear. It also supports the dogs 9. These dogs freely move within ways or channels formed within the dog casing 10. This dog casing 10 is best shown in Fig. 5 and is preferably a stamping, as shown. Its edges are turned up, forming the flanges 11. These flanges 11 may be omitted, if desired. The ways or channels 12 on the casing 10 are diametrically arranged on the opposite sides of the center opening 13 in the casing. The outside ends of the channels are closed in by flaps or projections which may be made on the casing by the same stamping operation which defines the casing's shape. These projections or flaps 14 are sufficiently long so that they may be bent around the back of the cap in order to hold the dog casing in position upon the cap. When the casing is in position and rests upon the cap, the channels 12 will be open at the inside and closed at the outside by the projections 14. The bottoms of the channels will be made by the cap. The channels 12 are each preferably provided with a longitudinal opening or window 15 which extends throughout the greater portion of the length of the channel. The center opening 13 of the casing is preferably of the same size as the center opening of the cap.

The dogs, shown in detail in Figs. 4, 7 and 8, are two in number and are alike. They are preferably made of a stamping and have an inclined edge 17, as shown, by means of which a cam action with the notches 4 in the spear is secured. Each dog has preferably a projection 18 at one side which projection is of such a size as to freely move within the longitudinal window 15. The size of the dog is such that it will freely move within the channel 12 so as to be capable of engaging within a notch 4 in the spear. The projections 18 are sufficiently large to prevent the removal of the dogs from the channels when the parts are in position and made up and are sufficiently small to permit the dogs to move through a sufficient distance to engage the notches 4 and properly prevent the roller from rotating. These projections 18 may be made in any manner but are preferably struck up while the dog is being stamped to shape. This will produce a depression behind the projection which is unobjectionable.

The dog casing is made preferably in a single stamping operation, the metal being bent in the direction shown by the arrow, Fig. 3. The windows or openings 15 are preferably made in the same operation in which the channels 12 are formed. As shown in Fig. 3, the bur which will be formed around the edges of the window 15 will extend outward. This is important, for if the windows were stamped inwards, the bur would project inward and interfere with the free movement of the dog.

The parts are assembled by inclosing the dogs within the channels 12 so that the projections 18 extend out through the windows 15. The dog casing is then secured to the cap. The engagement of the flanges 7 with the edges of the dog casing, and the engagement of the projections 14 with the back of the cap will firmly secure all of the parts together. The device thus constructed constitutes an article of manufacture which can be shipped in that form without danger of the dogs becoming lost or deranged in any manner.

The projections 18, in addition to the function of limiting the movement of the dogs, are also important in insuring that the dogs are put in in the right manner. If one or both of the dogs should be turned over, the projections 18 would engage with the cap and would prevent the proper attachment of the dog casing to the cap. The dog casing can be properly secured to the cap only when the dogs are in place with the projections 18 extending through the windows 15. This makes it possible to assemble the device and put the dogs in position by machinery, which is a great advantage over the pivot dogs or pawls heretofore used, in which it is necessary to adjust in position by hand. If the roller be slowly turned, the uppermost dog will slide down into the uppermost notch 4 in the spear. The inclined ends 17 of the dogs are so arranged in relation to the rotation of the spear that as the shade is unrolled, these inclined edges will engage with the notches 4. If the shade be allowed to wind up slowly, owing to the action of the spring, the uppermost dog will drop into the uppermost notch of the spear and the roller will be prevented from further rotation. If the shade be allowed to wind up rapidly, however, the dogs may be held away from engagement with the spear by centrifugal action,—an operation in which the dogs will engage or disengage with the notches 4 in the spear in exactly the same manner as the ordinary pivot pawls would engage.

The invention may be modified in many ways; in one modification, the projection 18 on the dog may be omitted, in which case the windows 15 would be omitted. Such a dog, without a projection, is shown in Fig. 9. This results in a somewhat cheaper construction than that before described. The dogs and channels need not be arranged as already described, as the channels may be inclined as shown in Fig. 10.

In accordance with the provisions of the patent statutes, I have described the principle of my invention, together with the apparatus which I now consider to represent the best embodiment thereof, but I desire to have it understood that the apparatus shown is merely illustrative, and that the invention can be carried out in other ways.

Having now particularly described and ascertained the nature of my invention, and in what manner the same is to be performed, what I claim and desire to secure by Letters Patent is:—

1. A cap for a shade roller having a dog casing attached thereto and an opening for the spear dogs within the casing each of the said dogs being smaller than the spear opening and means for retaining the dogs within the casing such means being independent of the spear.

2. A cap for a shade roller having a dog casing, with channels for the dogs, windows in the channels, and dogs within the channels, the said dogs having projections which extend through the windows.

3. A cap for a shade roller having a dog casing thereon, the said dog casing having integral channels for the dog, windows within the channels, the said windows being stamped from inward outward so that the bur made by stamping will project outward.

4. A dog casing for shade roller caps, the said casing being made of sheet metal and having stamped channels for the dogs, the said channels having windows, the said windows being stamped from inward outward so that the bur will extend outward from the channel.

5. A sliding dog for a shade-roller made of a stamping, with an integral lateral projection stamped out from the dog.

6. A cap for a shade roller having a dog casing thereon, the said dog casing being made of a stamping, with integral channels and projections inclosing the ends of the channels and bent back of the cap for securing the casing and cap.

7. A shade roller having a spear with notches therein, a ferrule, a cap, a dog casing on the cap, the said dog casing having channels the said channels being inclosed by means independent of the ferrule and sliding dogs within the dog casing engaging with the notches in the spear and means in addition to the spear for keeping the dogs within the channels.

8. A shade roller having a spear with notches therein and a cap, the said cap having a sheet metal dog casing thereon, the said casing having stamped channels with windows, sliding dogs within the channels, the said dogs having projections which pass through the windows, the said dogs engaging with the notches in the spear.

This specification signed and witnessed this fourth day of December, 1906.

EDMUND F. HARTSHORN.

Witnesses:
 E. L. DURGIN,
 GEO. E. GUNTHER.